(No Model.) 2 Sheets—Sheet 1.
W. W. VALENTINE.
VEHICLE WHEEL.
No. 347,845. Patented Aug. 24, 1886.
Fig. 1.
Fig. 2.
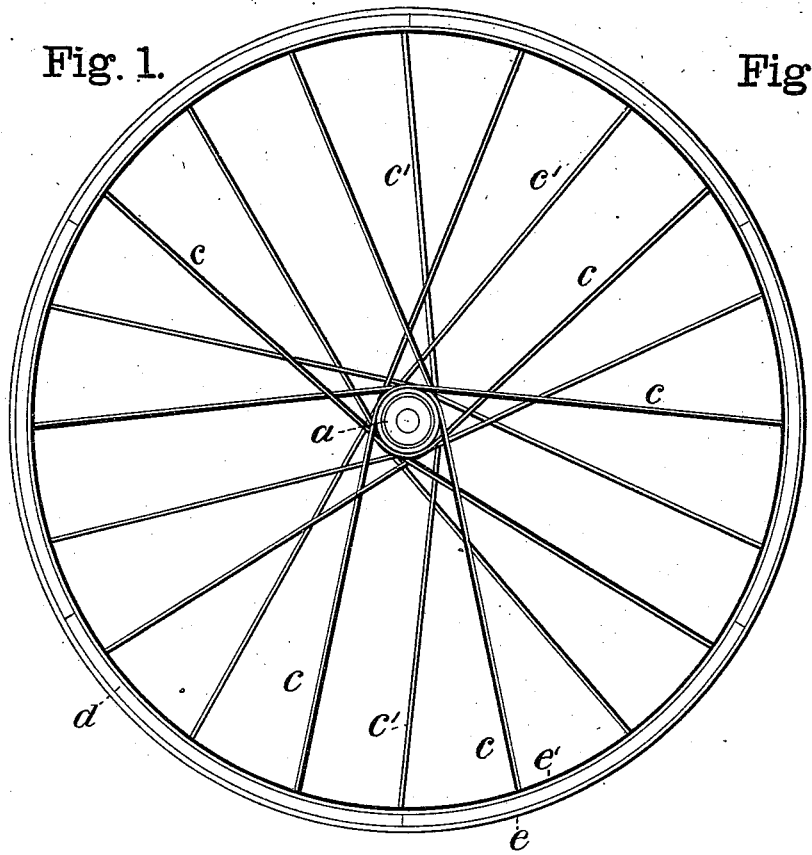
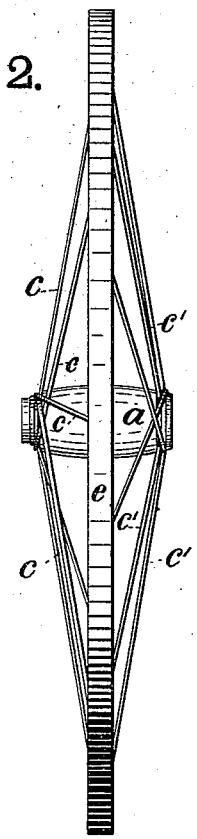
Fig. 3.
Fig. 4.
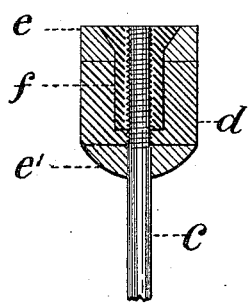
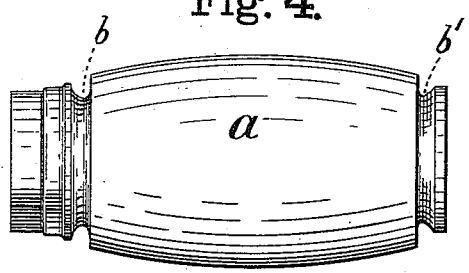
Witnesses.
Jennie W. Caldwell
James Sangster
Inventor.
W. W. Valentine

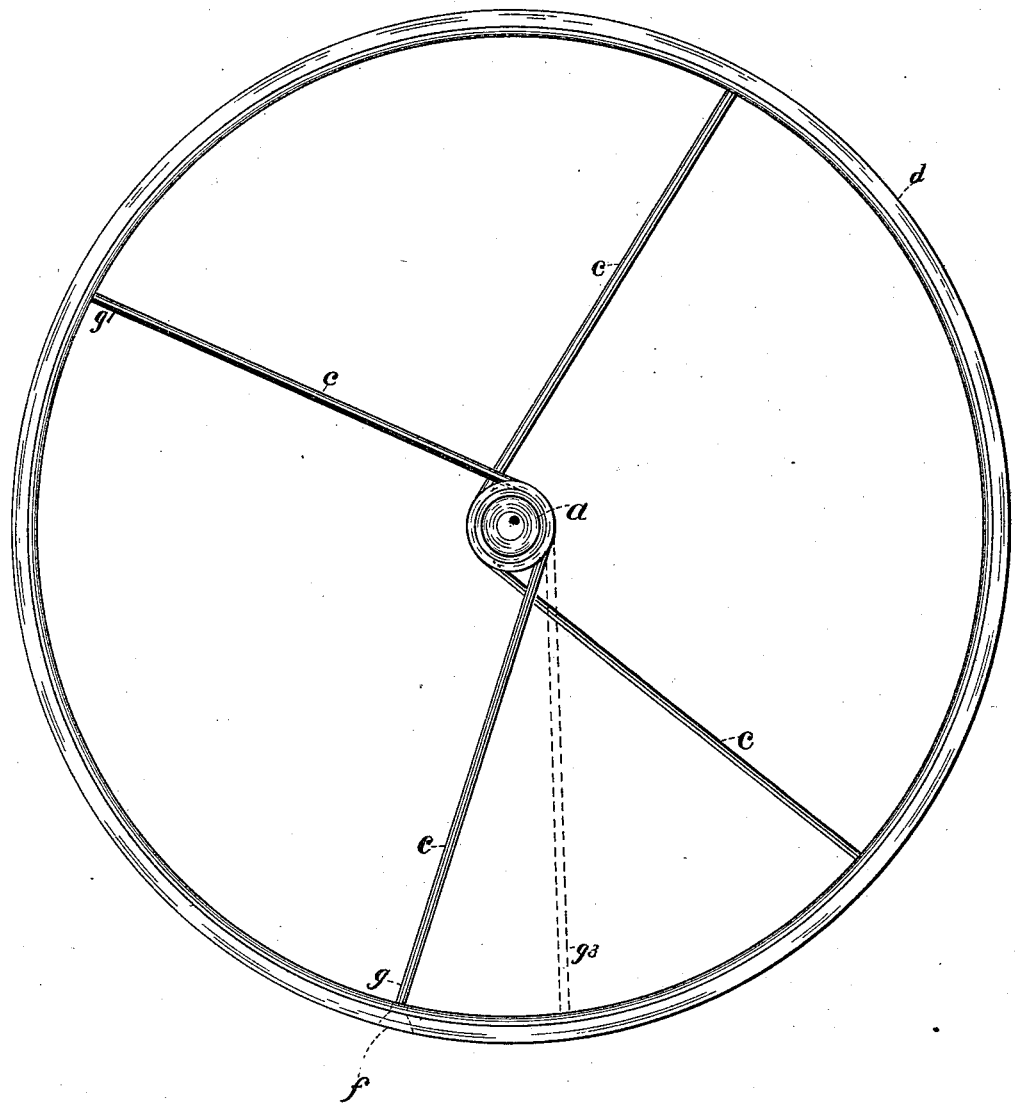

UNITED STATES PATENT OFFICE.

WALDO W. VALENTINE, OF BUFFALO, NEW YORK.

VEHICLE-WHEEL.

SPECIFICATION forming part of Letters Patent No. 347,845, dated August 24, 1886.

Application filed October 26, 1885. Serial No. 181,022. (No model.)

*To all whom it may concern:*

Be it known that I, WALDO W. VALENTINE, of Buffalo, in the county of Erie and State of New York, have invented certain new and useful Improvements in Vehicle-Wheels, of which the following is a specification.

My invention relates to improvements in wheels constructed upon the truss or tension principle, in which metallic spokes are used and tensioned between the hub and rim.

The objects of my invention are, first, to provide a secure seating for the spokes upon the hub without penetrating it; second, to dispose the spokes so as to avoid weak points and short bends, and so that the stress from a load will be more evenly distributed, all of which will be fully and clearly hereinafter shown, described, and claimed, by reference to the accompanying drawings, in which—

Figure 1 is a side elevation of a metallic-spoke wheel constructed upon my plan. Fig. 2 is a front elevation. Fig. 3 is an enlarged cross-section through the rim. Fig. 4 is an enlarged detached side elevation of the hub; and Fig. 5 represents an enlarged side elevation of the wheel, several pairs of the spoke being left off, so as to show its construction more clearly.

The hub $a$ is provided with encircling recesses or grooves $b$ $b'$. The spokes are made in pairs $c$ $c'$, and each pair is formed of one piece. (See Fig. 5, in which the pairs of spokes are more plainly shown.) They are so arranged that alternate points of the rim $d$ are connected with opposite ends of the hub $a$, while members of the same pair of spokes radiate from the same end of the hub. Each pair of spokes, $c$ $c$, for instance, (see Fig. 5,) partly encircles the hub in the recess $b$ and spans an arc equal to or exceeding a quarter of a circle, one end of the pair being connected by a nut, $f$, (shown by dotted lines in Fig. 5,) or other well-known means, at or about the point $g$, and the other end at the point $g'$. By this construction it will be seen that a load upon the hub will tend to slacken the spoke which is connected at the point $g$, while a stress will be brought upon the spoke connected at the point $g'$. If the pair of spokes were made so as to more nearly encircle the hub and come nearer together, as shown by the dotted lines $g^3$ in Fig. 5, then a load upon the hub would tend to slacken both spokes at the same time, and thereby loosen the pair upon the hub, so that a wheel so constructed would have each pair of its spokes alternately slackened and tightened as the wheel turned under a load, which, as will be seen, would cause considerable wear upon the hub and eventually loosen the spokes. One of the objects of my invention is to avoid this by the construction above shown. The wooden tire $d$ and the metallic rim $e'$ are pierced with holes the size of the spokes $c$ or $c'$, and the holes in the tire $e$, or in the wooden rim or tire $d$, are large enough for the nut $f$ to pass through, and are counterbored and countersunk from the outer side to receive the head of the nut $f$, within which screw-threads are cut to fit corresponding threads on the extremities of the spokes.

In small wheels the nuts and threads are dispensed with and the spokes are simply riveted in a metallic or keyed in a wooden rim. The exterior tire, $e$, may also be omitted in light wheels, as shown in Fig. 5, the wooden rim $d$, surrounding the metallic one, itself forming the elastic tire of the wheel.

The advantages of a wooden tire, where one is required, are that it is less elastic than rubber or other similar material, but it is sufficiently elastic to save the spokes from the concussion and injury incident to metal tires, and is just sufficiently elastic to deaden the sound, and still hard enough to render it preferable to either metal or rubber for many uses. By this construction the hub is encircled near both ends by the spokes, whose entire strength is exerted to press its fibers more closely together, not to draw them asunder.

The spokes themselves, instead of being rigidly fixed in a rigid hub, are wrapped around a cushioned or wooden surface, which preserves them from unequal strain and injury by concussion. The diverging of each pair of spokes to an angle of ninety degrees or more tends to exempt them from the effects of slackening while under a load, and its attendant consequences, as before mentioned. This construction secures generally a more perfect distribution of the stress from any cause, since such stress is communicated from one section of any pair of spokes to the other. The secondary or latitudinal brace of the spokes, resulting from thin exterior attachment to the hub, fortifies them against the wrenching tendency of the crank in bicycles and similar stresses. The wooden hub, strengthened instead of weakened by the opposing draft of the spokes, and uninjured in its fiber by their penetration, may be conveniently centered and bored for the axle, and affords an unequaled setting for both.

I claim as my invention—

1. A vehicle-wheel having a wooden hub adapted to fit an axle in and provided with encircling grooves near each end, in combination with tensioned spokes, two in one piece, bending partly around the hub at their junction in said grooves, and connected to the rim, substantially as described.

2. A vehicle-wheel provided with a wooden hub suitable for setting an independent axle in, and having tensioned spokes attached exteriorly thereto and compressing it, substantially as described.

3. A vehicle-wheel having latitudinally-divergent spokes, two in one piece, the angle of divergence in which is between a quarter and a third of a circle, for the purposes described.

4. A vehicle-wheel having a metallic rim combined with a wooden tire secured thereto by bolts, as and for the purposes described.

WALDO W. VALENTINE.

Witnesses:
JUDSON H. NORRIS,
D. DUNCAN.